May 2, 1933.  F. J. SHOOK  1,906,641
BEAD RING APPLYING MACHINE
Filed May 31, 1929  2 Sheets-Sheet 1
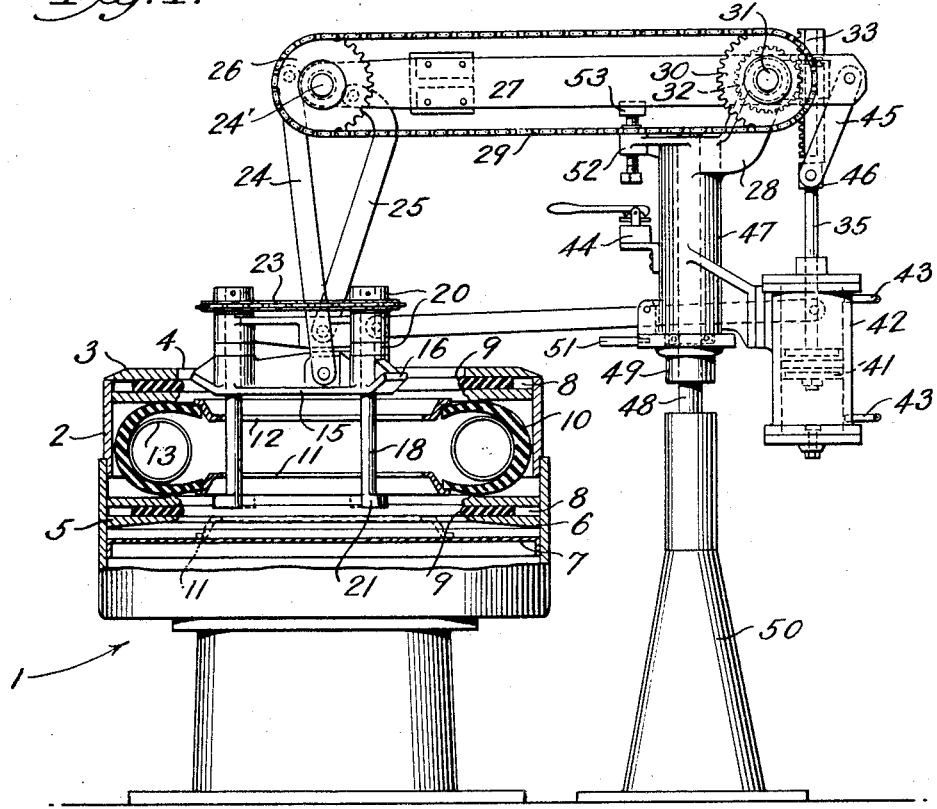
Fig. 1.
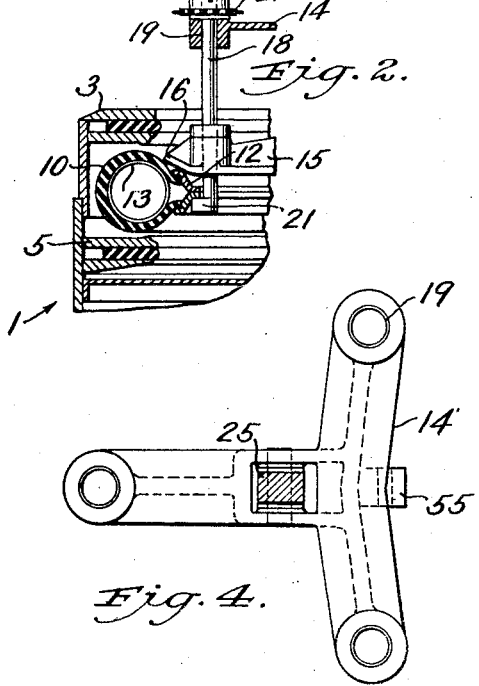
Fig. 2.
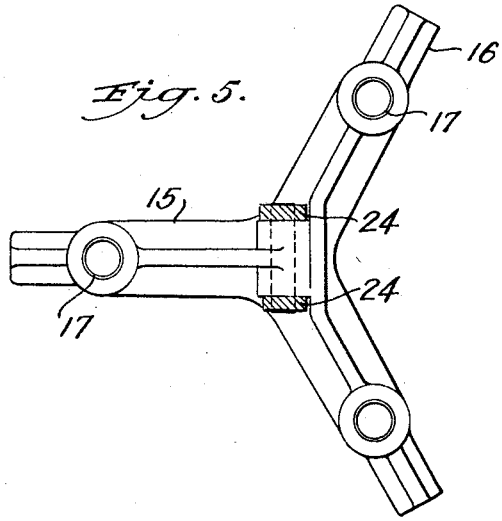
Fig. 5.
Fig. 4.
INVENTOR
Florian J. Shook
BY
ATTORNEY May 2, 1933. F. J. SHOOK 1,906,641
BEAD RING APPLYING MACHINE
Filed May 31, 1929   2 Sheets-Sheet 2
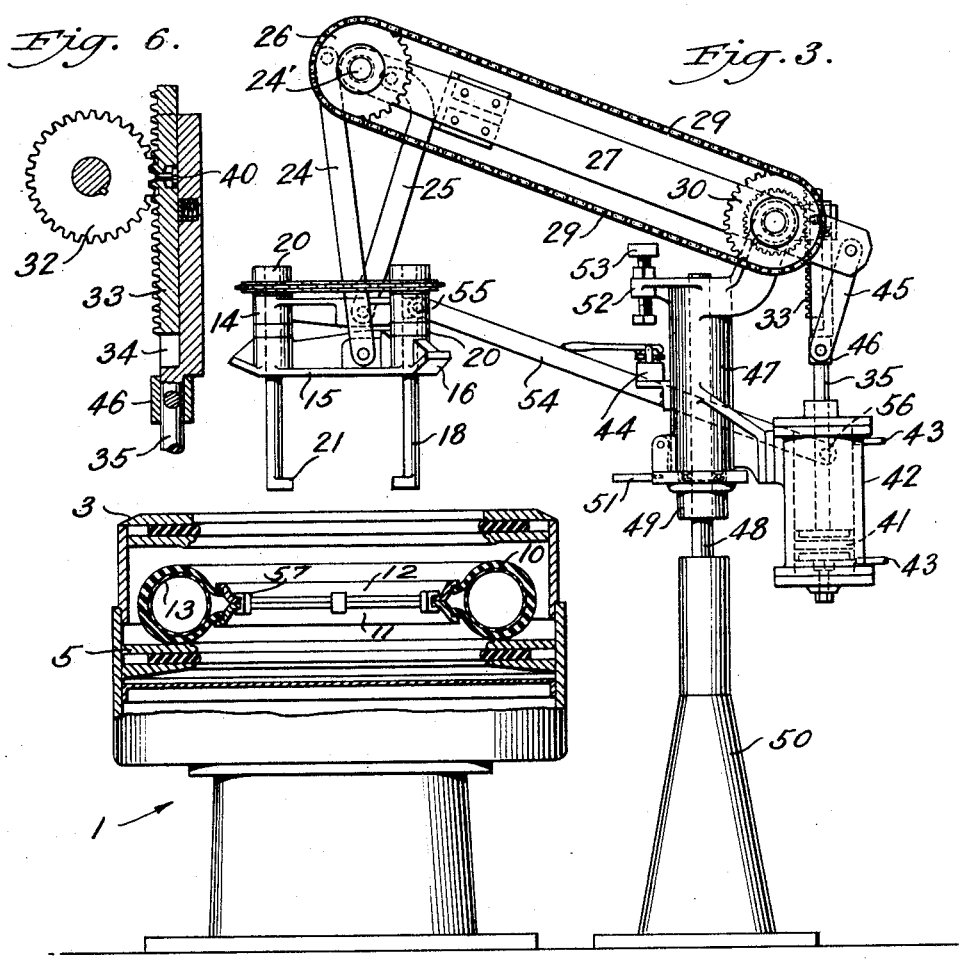
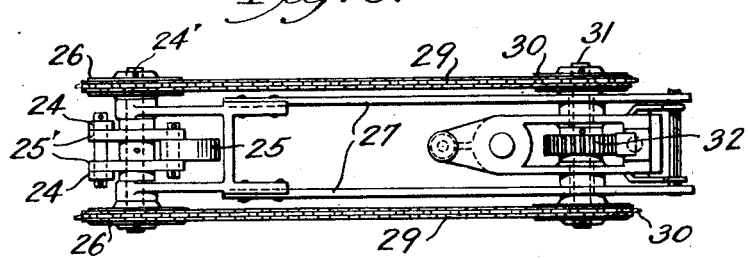
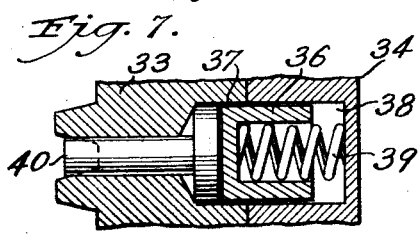

Patented May 2, 1933

1,906,641

UNITED STATES PATENT OFFICE

FLORIAN J. SHOOK, OF AKRON, OHIO, ASSIGNOR TO UNITED STATES RUBBER COMPANY, OF NEW YORK, N. Y., A CORPORATION OF NEW JERSEY

BEAD RING APPLYING MACHINE

Application filed May 31, 1929. Serial No. 367,508.

This invention relates to a machine for clamping bead rings on to tire casings.

In the manufacture of pneumatic tires the constituent elements of the tire are assembled upon a drum so as to form an endless band called a pulley band. The pulley band is expanded into the shape of a tire casing by suitable means such as a vacuum box. While the pulley band is held in the shape of a tire casing, it is usual to insert a curing bag within the shaped casing, whereupon the assembled curing bag and shaped casing are removed from the vacuum box and inserted into a mold. It is usual to apply bead rings, which serve to clamp the beads of the tire casing together, to the casing after it has been inserted into the mold, the operation of applying the bead rings to the tire casing being carried out manually. While these steps in the art of building pneumatic tires may be successfully carried out with tires of small size, it is not readily applicable to the larger and largest sizes of pneumatic tires inasmuch as the force necessary to apply the bead rings is too great to permit the successful use of manual labor to perform the operation continuously.

It is the object of this invention to provide suitable mechanism for clamping bead rings on to a tire casing.

Other objects and advantages of the present invention will appear in the following detailed description taken in connection with the accompanying drawings, in which:

Fig. 1 is a side elevation of my bead ring applying machine in combination wth a vacuum box which is shown partly in section.

Fig. 2 is a detailed sectional view showing a part of the assembly of Fig. 1 in a different stage of the operation of the machine.

Fig. 3 is a view similar to Fig. 1 showing the machine at a different point in its operation.

Fig. 4 is a detail view of one of the clamping spiders.

Fig. 5 is a detail view of another of the clamping spiders.

Fig. 6 is a detail view showing the rack and pinion mechanism.

Fig. 7 is a detail view of the rack.

Fig. 8 is a top plan view of the bead ring clamping machine.

The vacuum box 1 consists of the casing 2 having a top plate 3 hinged thereto which top plate is provided with an aperture 4 through which a pulley band may be inserted. A bottom wall 5 similar to the top plate 3 is provided with an aperture 6 for receiving a pulley band. The plate 7 provides a support upon which a pulley band may rest when it is first inserted into the machine and serves to properly position the pulley band with respect to the top plate 3 and the bottom wall 5. The top plate 3 and the bottom wall 5 are provided with circumferentially extending grooves 8 in which the elastic rings 9 are positioned. The grooves 8 are connected with a suitable evacuating means (not shown) whereby the fluid pressure in the grooves 8 may be reduced so as to cause the expansion of the elastic rings 9 thus permitting the insertion of the pulley band within the vacuum box. After the pulley band is inserted within the vacuum box the grooves 8 are opened to atmospheric pressure so that the elastic rings 9 may contract into contact with the pulley band to form an air-tight seal therewith. The pulley band, the top plate 3, the bottom wall 5, and the wall 2 form a substantially air-tight chamber with which a suitable evacuating means (not shown) is connected whereby the interior of the chamber may be exhausted, thus creating a differential pressure due to the atmospheric pressure which results in the expansion of the pulley band into the shape of a tire casing as shown at 10 in Fig. 1. As the shaping of the pulley band progresses the contact between the pulley band and the elastic ring 9 is broken but an air-tight seal between the top plate 3, bottom wall 5, and the pulley band is maintained by the inner surfaces of the plate and wall. This construction of the vacuum box is a conventional one and any other suitable form of vacuum box, especially such as that shown in the companion application Serial No. 367,503, filed May 31, 1929, by Allen L. Heston.

A bead ring 11 is inserted into the vacuum box and allowed to rest upon the platform 7 as shown in dotted lines in Fig. 1 prior to the insertion of the pulley band. The pulley band is inserted and one of the beads thereof allowed to rest upon the margin of the bead ring 11. After the expansion of the pulley band into the shape of a tire casing in the manner outlined above, a curing bag 13 is inserted into the shaped casing 10 and an upper bead ring 12 is positioned in the vacuum box and allowed to rest with its marginal portion upon the upper bead of the tire casing.

The mechanism for clamping the bead rings 11 and 12 together after they have been inserted into the vacuum box includes a pair of spiders 14 and 15. The spider 15 is provided with suitable lugs 16 projecting therefrom and provided with faces adapted to contact with the upper bead ring 12 as clearly shown in Fig. 2. The spider 15 is provided with apertures 17 through which the rods 18 extend. The rods 18 are rotatably mounted in apertures 19 in the spider 14 and held against longitudinal motion with respect to the spider 14 by suitable collars 20 fixed on to the rods. The rods 18 are provided with laterally extending lugs 21 which are adapted to engage with the lower bead ring 11 as clearly shown in Fig. 2.

The rods 18 are provided at the end distant from the lug 21 with sprockets 22 rigidly fixed thereto and about which the chain 23 is entrained. By manipulation of the chain 23 the lugs 21 may be rotated into a variety of positions, one of which is such that the lugs are inturned as shown in Fig. 3 which facilitates the insertion and removal of the clamping means into and from the vacuum box and bead rings. Preliminary to the insertion of the clamping device into the vacuum box and through the bead rings the lugs 21 are turned inwardly as shown in Fig. 3 and after the clamping device has been moved to the position shown in Fig. 1 the chain 23 is manipulated so as to turn the lugs 21 from the position shown in dotted lines to the position shown in full lines in Fig. 1.

As shown in Fig. 1 when the clamping device is inserted into the vacuum box and through the bead rings, the spiders 14 and 15 are juxtaposed so that the clamping lugs 16 and 21 are separated. In order to effect the separation of the spiders 14 and 15 the juxtaposition of the lugs 16 and 21 which results in the clamping of the bead rings together, a suitable toggle lever system consisting of links 24 pivotally connected to the spider 15 and a link 25 pivotally connected to the spider 14 is provided, the other ends of the link 24 and the link 25 being pivotally connected, as shown in Fig. 8, to radius arms 25' which are rigidly connected to shaft 24' upon which sprockets 26 are fixed. The shaft 24' is rotatably mounted in the end of the arm 27. The rotation of the sprockets 26 is effected by the chains 29 which pass over the sprockets 26 and the sprockets 30, the sprockets 30 being fixed upon the shaft 31 passing through the journals carried by the bracket 28. A pinion 32 is rigidly fixed to the shaft 31 for effecting the drive of the sprockets 30. The pinion 32 is driven from the rack 33 which is slidably mounted in block 34 carried on the end of the piston rod 35 (see Fig. 6). Normally the rack 33 is locked against movement with respect to the block 34 by the cylinder 36 (see Fig. 7) operating through the openings 37 and 38 in the rack and the block respectively. A spring 39 is provided for normally holding the cylinder 36 in locking position, as shown in Fig. 7. A plunger 40 is mounted for sliding movement in the rack 33 so that upon contact of the end of the plunger 40 with a tooth of the pinion 32 the plunger 40 will be thrust to the right as shown in Fig. 7 thereby moving the cylinder 36 out of locking relation with respect to the rack 33 so as to permit relative movement of the rack 33 and the block 34 for a purpose which will appear later. The rack is actuated through the piston rod 35 connected to piston 41 moving in the cylinder 42 and operated by fluid pressure through pipe connections 43 controlled by valve 44.

The arm 27 is connected by a link 45 with a cross head 46 through which the piston rod 35 slides. The lower end of the block 34 strikes the cross head 46 in the downward motion of the piston rod 35 so as to effect the rotation of the arm 27 about the shaft 31 thereby raising the arm and clamping device from the position shown in Fig. 1 to that shown in Fig. 3. The journal bracket 28, which carries the arm 27, and the cylinder 42 are mounted upon a sleeve 47 which in turn is mounted for rotation about the shaft 48 and rests upon the collar 49 fixed upon the shaft 48, the shaft 48 being carried by suitable pedestal 50. The sleeve 47 is provided with a handle 51 by which the sleeve and all the mechanism carried thereby may be rotated either into or out of operative relation with respect to the vacuum box 1. The sleeve 47 is provided with extension 52 through which a screw passes to support block 53 which serve to limit the movement of the arm 27 and clamping mechanism mounted thereon as shown in Fig. 1.

A radius link 54 extending substantially parallel to the arm 27 is pivotally connected at its ends with the frame 14 as shown at 55 and with the cylinder 42 as shown at 56 or any other suitable point on the machine. The radius link serves to prevent swaying of the clamping mechanism as it is raised and lowered.

In carrying out the method of this invention and by the operation of the bead clamping machine hereinabove described, the bead ring 11 is inserted in the vacuum box 1 followed by a pulley band which is allowed to rest upon the marginal portion of the bead ring 11. The pulley band is expanded into the shape of a tire casing as shown at 10 in Fig. 1 and a curing bag 13 inserted therein. An upper bead ring 12 is laid upon the casing 10 with its marginal edge resting upon the bead of the casing. During these operations the bead clamping machine is positioned so as not to interfere. At this time the sleeve 47 is rotated by manual manipulation through the handle 51 thereby moving the clamping mechanism into the position shown in Fig. 3. The valve 44 is operated to apply fluid pressure beneath the piston 41 so as to raise it into the position shown in Fig. 1. The motion of the piston allows the cross head 46 to move upwardly thereby permitting the rotation of the arm 27 from the position shown in Fig. 3 to the position shown in Fig. 1 which results in the positioning of the clamping means in the vacuum box and through the upper bead ring. During these operations the lugs 21 on the rods 18 are inturned as shown in Fig. 3 and the dotted lines in Fig. 1. By manipulation of the chain 23 the lugs 21 are turned from the dotted line position to the full line position as shown in Fig. 1. At this time or before the turning of the lugs 21 to their outer position, a lower bead ring 11 may be raised manually from the position shown in dotted lines in Fig. 1 and allowed to rest upon the lugs 21.

The manual positioning of the lower bead ring 11 on the lugs 21 is necessary with the conventional type of vacuum box such as shown, but with the type of vacuum box disclosed in the companion application Serial No. 367,503 herein above referred to, the lower bead ring 11 is moved upwardly by the motion of the lower wall of the vacuum box so that when the clamping mechanism is positioned within the vacuum box and the lugs 21 turned outwardly, they will be beneath the inner margin of the bead ring.

The valve 44 is again manipulated so as to cause the further movement of piston 41 and as the piston rod 35 moves further in its course the block 34 contacts with the end of the rack 33 thereby setting it in motion. As the rack 33 moves the pin 40 is released and, the apertures 37 and 38 being in registration, the spring 39 acts to thrust the cylinder 36 into locking position thereby locking the rack 33 and block 34 together.

As the motion of the piston 41 continues, the pinion 32 is rotated thereby driving the sprockets 26, which effects the operation of toggle links 24 and 25, the link 24 being moved downwardly and the link 25 upwardly, which results in a downward motion of the spider 15 and the upward motion of the spider 14. The motions of the spiders 14 and 15 bring the lugs 16 and 21 together in such a manner as to clamp the bead rings therebetween as shown in Fig. 2. The motion of the toggle levers continues until the link 24 has reached its lowermost position and the link 25 the uppermost position, at which points the toggle action reaches its fullest effect and results in the application of a maximum force upon the bead rings. When the bead rings have been clamped together, suitable clips 57 are applied thereover to maintain them in clamped relation.

After the clamping of the bead ring has been effected the valve 44 is manipulated to pass fluid pressure into the top of the cylinder 42 thereby moving the piston downwardly, which motion causes the separation of the lugs 16 and 21 and brings the spiders 14 and 15 into contact. Inasmuch as further motion of the piston 31 would be opposed or prevented by the contact of the spiders 14 and 15, it is necessary that the piston rod continue its motion without acting upon the toggle system. It is for this purpose that the cylinder lock 36 is provided and when the spiders have come into contact, the pinion 32 acts upon the plunger 40 so as to move the cylinder 36 into unlocking position so that the piston 35 and the block 34 may continue their movement without moving the toggle lever system. The continued motion of the piston rod 35 brings the block 34 into contact with the cross head 46 thereby rotating the arm 27 from the position shown in Fig. 1 to that shown in Fig. 3. The clamping mechanism may then be rotated out of the way by turning the sleeve 47. At that time the tire casing containing the curing bag 13 and having the bead rings 11 and 12 clamped thereon as shown in Fig. 3 is left in the vacuum box. The top plate 3 is rotated about its hinge so as to open the vacuum box and the casing and curing bag with the bead rings thereon removed from the vacuum box. The cycle of operations may then be repeated.

While one embodiment of my invention has been specifically disclosed, it is intended only as an example of my invention inasmuch as many modifications may be made therein all within the spirit and scope of my invention, as will be obvious to one skilled in the art.

For an understanding of the scope of my invention, reference is made to the following claims.

Having thus described my invention, what I claim and desire to protect by Letters Patent is:

1. The combination of a vacuum box adapted to expand pulley bands into tire casings, a clamping device, a movable support upon which the clamping device is mounted, and pneumatic means for operating the support so as to effect the insertion and the retraction of the clamping device into and out of operative relation with respect to a tire casing held in shape in the vacuum box, and for operating the clamping device so as to apply bead rings to the tire casing while the tire casing is held in shape by the vacuum box.

2. A device for applying bead rings to tire casings comprising in combination, frames carrying lugs adapted to contact with the bead rings, said frames being slidably mounted on one another so that the lugs may be juxtaposed or separated by movement of the frames, a toggle lever system for moving said frames, and power means for operating a lever system.

3. In a bead ring applying machine in combination, clamping means for clamping bead rings on to tire casings, said clamping means being insertable into and removable from a pulley band shaping device, supporting means for carrying the clamping means, said supporting means being movable to effect the insertion and removal of the clamping means into and from the shaping device, and means for successively operating the clamping means and the supporting means.

4. In a bead ring applying machine in combination, a pair of frames provided with bead ring engaging members and being relatively movable to clamp bead rings together, a toggle lever system for manipulating said frames, a movable support for said frames and toggle lever system, said support being movable to position the frames into and out of operative relation with bead rings and a tire casing, and means for effecting the successive operation of the movable support and the toggle lever system.

5. A portable bead ring applying device comprising in combination members provided with faces adapted to contact with bead rings, said members being mounted for relative movement so as to effect a clamping action on bead rings, and common means for transporting said members and effecting their relative movement.

6. In a bead ring applying machine, a clamping mechanism comprising a portable member having bead ring engaging lugs thereon, a portable frame mounted for movement relative to the member, elongated members rotatably mounted in the frame and carried by said member, bead ring engaging projections extending laterally from the elongated members, means for rotating the elongated members whereby the lugs thereon may be adjusted to a variety of positions so as to facilitate the insertion and removal of the elongated members into and from bead rings, and supporting means for said portable member and frame having provision for causing relative movement therebetween.

Signed at Akron, county of Summit, State of Ohio, this 6th day of May, 1929.

FLORIAN J. SHOOK.